A. AICHELE.
CHANGE SPEED PULLEY.
APPLICATION FILED AUG. 19, 1909.
998,733.
Patented July 25, 1911.
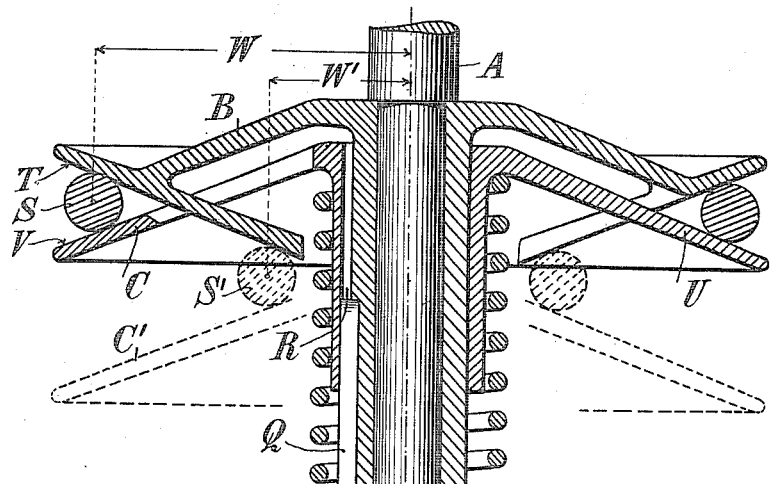
Fig.1.
Fig.3.
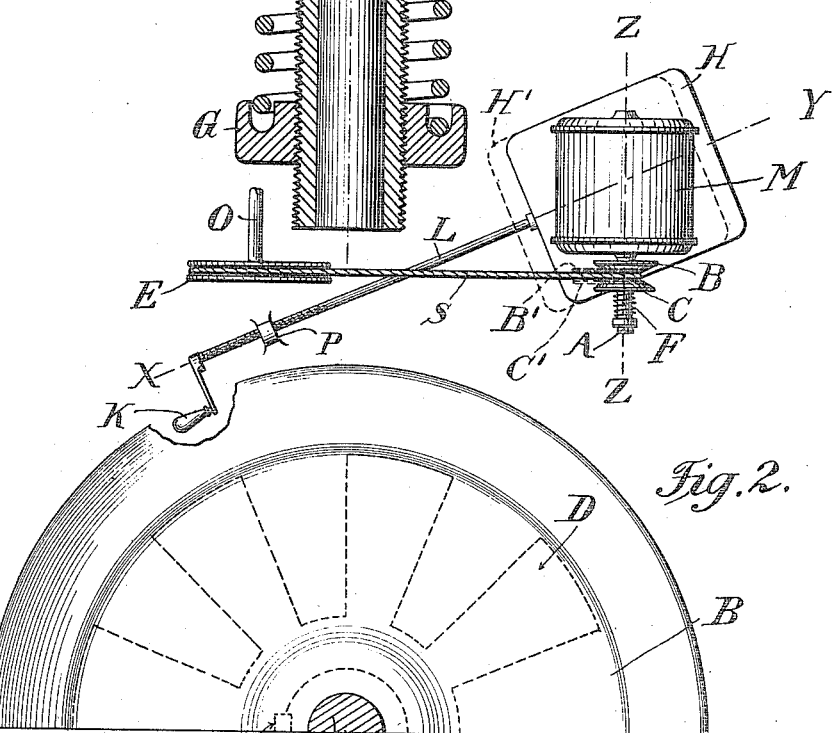
Fig.2.
Witnesses:
Jesse N. Lutton.
Inventor:
Albert Aichele
by Henry Orth
Atty.

UNITED STATES PATENT OFFICE.

ALBERT AICHELE, OF BADEN, SWITZERLAND, ASSIGNOR TO THE FIRM OF AKTIENGESELLSCHAFT BROWN, BOVERI & CIE., OF BADEN, SWITZERLAND.

CHANGE-SPEED PULLEY.

998,733.

Specification of Letters Patent. Patented July 25, 1911.

Application filed August 19, 1909. Serial No. 513,662.

*To all whom it may concern:*

Be it known that I, ALBERT AICHELE, a citizen of the Republic of Switzerland, residing at Haselstrasse, Baden, Switzerland, have invented certain new and useful Improvements in Change-Speed Pulleys; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of the present invention is an arrangement in which the driving and driven shafts are each fitted with a rope or belt pulley the speed ratio of which varies with the distance separating the shafts. To obtain this one of the pulleys is designed in such a manner that the driving radius varies according to the tension of the belt or rope. The pulley is made in two parts the inner sides of which form a V groove and which can be pressed the one into the other so that the groove becomes more or less deep. The more the two parts are separated the deeper and broader becomes the groove and vice versa.

One part of the pulley is pressed into the other by means of a spring. Against the action of this spring the tension of the belt works and tends to separate the two parts by reason of a wedging action of the belt on said parts. The wedging action ceases when the force of the spring and the tension of the belt are equal. If the distance between the driving and driven shafts and consequently the tension of the belt are increased, the two parts of the pulley are separated, the groove becomes broader and deeper and the driving radius becomes smaller. If on the contrary the driving and driven shafts are brought nearer together, the force of the spring overcomes the tension of the belt and the two parts of the pulley are closed together, the groove becomes shallower and the driving radius larger. Thus by means of the arrangement forming the object of the present invention the ratio of the diameters of the driving and driven pulleys is varied by varying the distance separating them, thereby altering the ratio of transmission.

In the accompanying drawings Figure 1 is a longitudinal sectional view of a pulley embodying my invention. Fig. 2 is a top plan view. Fig. 3 is a plan view of a device for altering the tension of the driving belt or rope.

A designates the shaft on which the part B of the pulley is fixed. The part B has a conical surface T partly cut out as indicated at D in Fig. 2 by the dotted lines. Corresponding spokes U of the movable part C fit into the slots thus formed. The movable part C of the pulley possesses a conical surface V facing the surface T of the part B in such a manner that the two surfaces lie at an angle. The part C can be moved relatively to the part B in a direction parallel to its axis sliding with the keyway R on the key Q and thus being prevented from turning relatively to the part B. The part C is pressed against the part B by means of a spring F resting on a ring G which is screwed on to the sleeve of the part B. The belt or rope runs in the groove formed by the surfaces T and V. The driving radius is represented by W. If the belt tension is increased the wedging of the belt in the groove formed by the surfaces T and V exerts a force in a direction parallel to the axis of the shaft which overcomes the force of the spring F and presses it together. The part C slides into the position $C^1$ and the driving radius is reduced to the length $W^1$.

The variation in the belt tension is best brought about by varying the distance between the driving and driven shafts. A device for this purpose is shown as an example in Fig. 3 where M indicates a motor on the shaft A of which the parts B and C of a pulley as described above are fitted. The motor is fixed to a bed plate H which can be moved in a direction indicated by the line X—Y parallel to the generatrix of the conical surface of the fixed part B of the pulley on the motor shaft A by means of a screw L, a handle K and a fixed nut P. The shaft O is driven from the motor M by means of the pulley E and a belt or rope S. If the bed plate H is brought into the position $H^1$ by turning the handle K, the fixed part B of the pulley comes into the position $B^1$ and the movable part C owing to the action of the spring F into the position $C^1$. The driving radius of the pulley becomes larger and at the same time the belt or rope comes nearer the motor. On changing the distance between the shafts O and A by means of the handle K, a lateral and axial movement of the motor takes place and causes the fixed part B and the movable part C of the pulley to assume the positions indicated by the dotted lines B', C' respectively. With this arrangement an alteration of the ratio of the diameters of the driving and driven pulleys can be effected without any alteration in the position of the belt plane. An alteration in the ratio of the diameters of the pulleys can also be brought about by pressing a tension roller on to the belt or rope.

It is an advantage to so adjust the tension of the spring F that the force with which it presses the two parts of the pulley together increases or decreases in accordance with the increase or decrease in the driving diameter of the pulley, the object obtained being a correspondingly larger belt tension the smaller the diameter so that approximately the same energy can be transmitted at all ratios.

Having now particularly described and ascertained the nature of the said invention and in what manner the same is to be performed, I declare that what I claim is:

1. In combination two parallel shafts, one a driving and the other a driven shaft, a pulley on one of said shafts, a change-speed pulley on the other shaft composed of two parts having relative axial movement but not rotatable on its shaft, an endless driving member connecting the pulleys, and means to simultaneously move one of said shafts laterally and axially to automatically vary the ratio of the diameters of the pulleys.

2. In a change speed mechanism, the combination of parallel shafts, a pulley on one of said shafts, a pulley on the other shaft composed of two parts having oppositely positioned conical surfaces one of said parts being fixed on the shaft and the other axially movable but not rotatable on the latter, an endless driving member connecting the pulleys and lying between said conical surfaces, and means to move one of said shafts in a direction parallel to an element of the conical surface of said fixed part, for the purpose specified.

3. In a change speed mechanism, the combination of parallel shafts, a pulley on one of said shafts, a pulley on the other shaft composed of two parts having oppositely positioned conical surfaces one of said parts being fixed on the shaft and the other axially movable but not rotatable on the latter, a spring to press said parts together, an endless driving member connecting the pulleys and lying between said conical surfaces, and means to move one of said shafts in a direction parallel to an element of the conical surface of said fixed part for the purpose specified.

4. In a change speed mechanism, the combination with a driven shaft, a driving shaft mounted parallel thereto and a pulley on the driven shaft, of a pulley on the driving shaft composed of two parts having oppositely positioned conical surfaces one of said parts being fixed on the driving shaft and the other axially movable on the latter, a spring adapted to move the movable part toward the fixed part, an endless driving band connecting the pulleys and lying between said conical surfaces, and means to move the driving shaft in a direction parallel to an element of the conical surface of said fixed part.

In testimony that I claim the foregoing as my invention, I have signed my name in presence of two subscribing witnesses.

ALBERT AICHELE.

Witnesses:
ERNST FISCHER,
CARL GUBLER.